March 1, 1949.　　　　O. F. RITZMANN　　　　2,462,995
PROCESS CONTROL SYSTEM
Filed April 11, 1947　　　　　　　　　　4 Sheets-Sheet 1
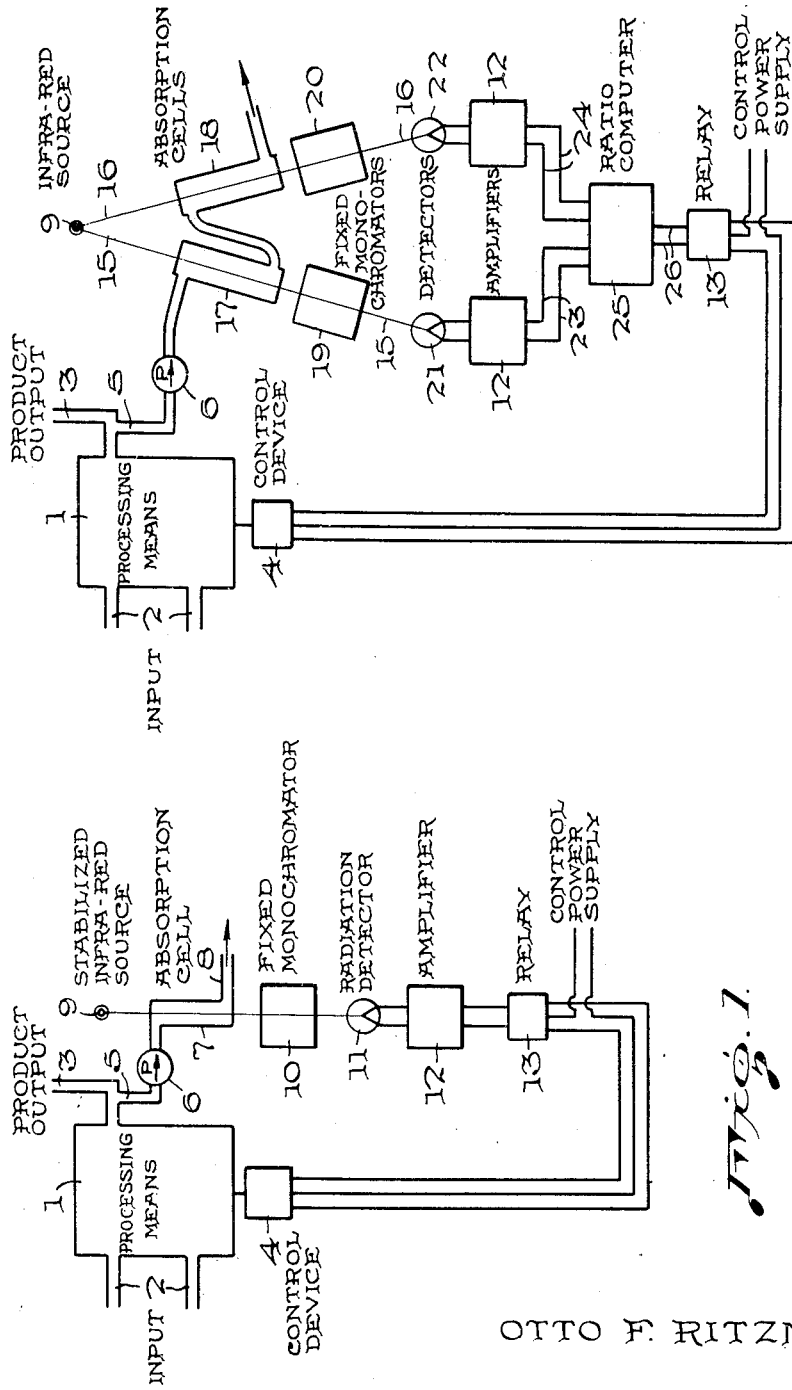
Inventor
OTTO F. RITZMANN
By A. M. Houghton
his Attorney

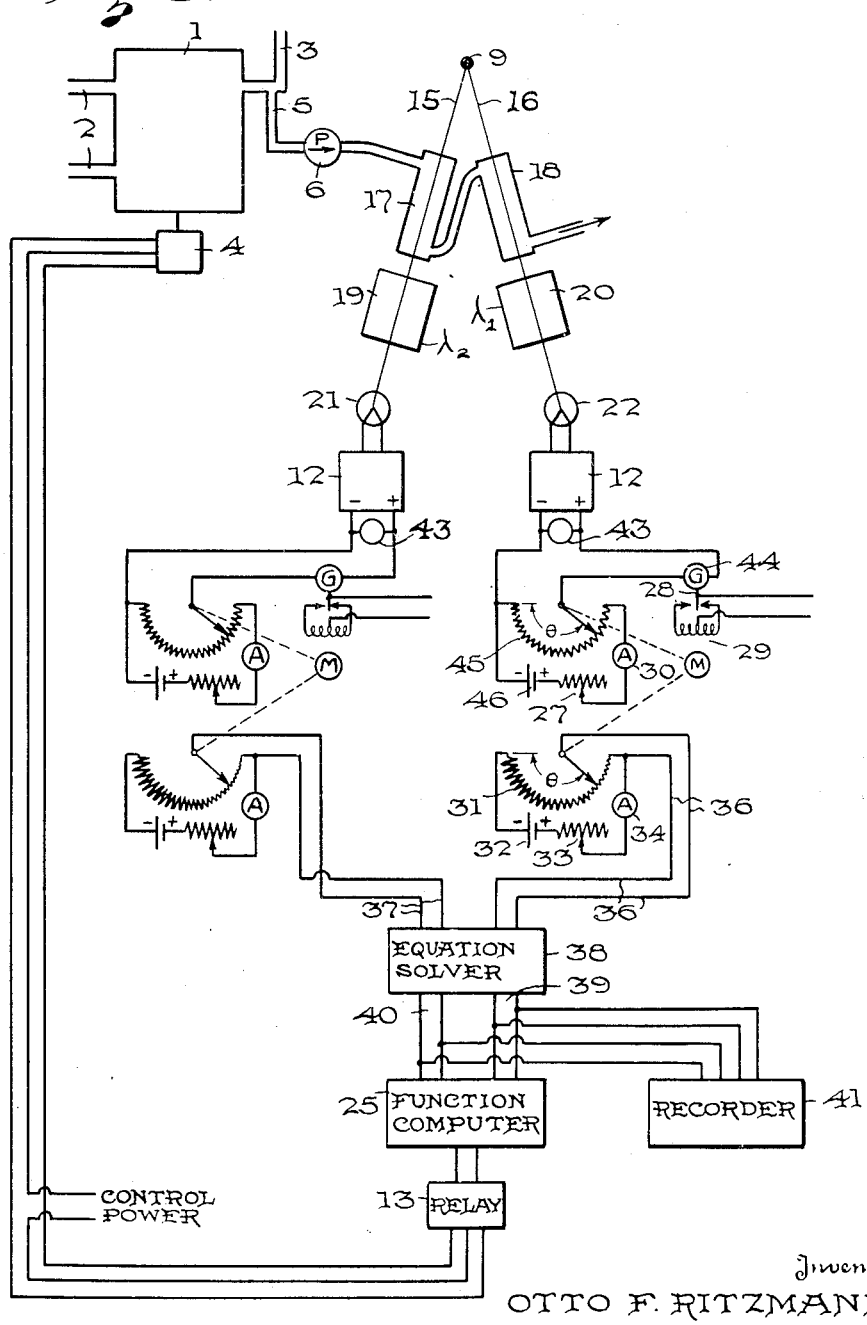

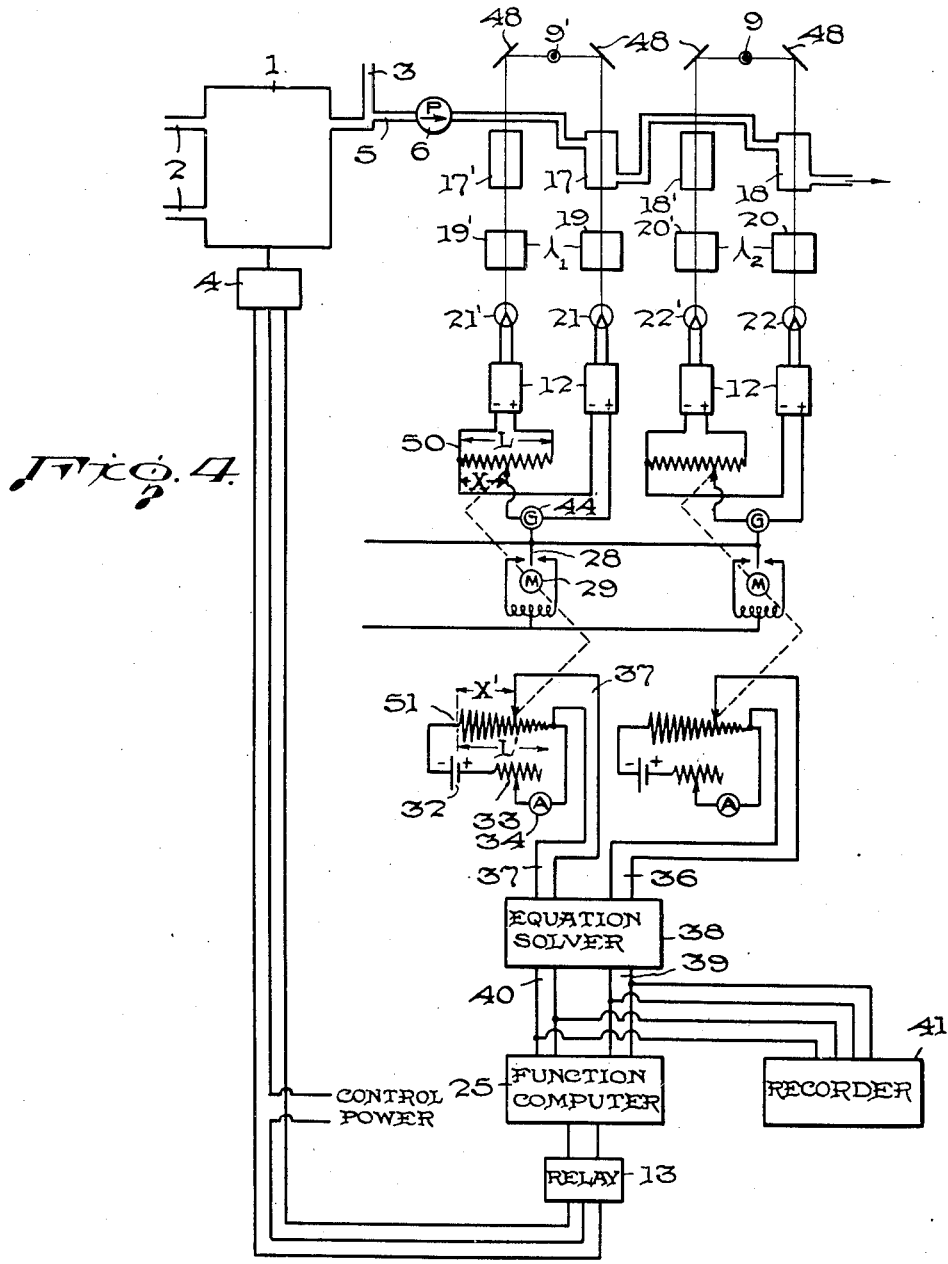

March 1, 1949.  O. F. RITZMANN  2,462,995
PROCESS CONTROL SYSTEM
Filed April 11, 1947  4 Sheets-Sheet 4

Inventor
OTTO F. RITZMANN
By A. M. Houghton
  His Attorney

Registered Mar. 1, 1949

2,462,995

UNITED STATES PATENT OFFICE 2,462,995

PROCESS CONTROL SYSTEM

Otto F. Ritzmann, Takoma Park, Md., assignor to Gulf Oil Corporation, Pittsburgh, Pa., a corporation of Pennsylvania Application April 11, 1947, Serial No. 740,826

3 Claims. (Cl. 250—43)

This invention concerns indicating, recording and control apparatus for manufacturing processes. More particularly it involves the use of an infra-red spectrometer as a control apparatus for a chemical process.

In conducting chemical reactions or physicochemical processes, in the manufacture of chemicals or other products, it is customary to run one or more source materials or primary chemicals into a reaction chamber. This chamber may consist of a single vessel, such as a retort, or in more complicated processes, it may be an elaborate assembly of chemical process equipment. In many reactions, the primary chemicals do not react so as to completely combine, but instead reach an equilibrium condition in which the primary chemicals and products formed are in a state of dissociation and recombination so that the desired product is contaminated by either primary chemicals or intermediate compounds. On the other hand there may be practical limitations of conditions, such as temperature and pressure, which arise for instance because of the physical properties of materials of which the reaction chamber is made or because of decomposition reactions which may set in. As a result it is usually desirable to operate a reaction or process at some known optimum set of conditions which give high output together with operating efficiency. In order to maintain the reaction under these optimum conditions, various elements or parameters may be brought under control. One may, for instance, control the temperature of a reaction or the pressure, or the amount or character of catalyst, or the relative concentrations of primary chemicals which are used, etc. All of these things will affect the product obtained.

It has been suggested that for oil refinery processes one may achieve a certain measure of control by extracting from some point in the process a sample of hydrocarbon gas, transferring this sample in its container to a routine spectrophotometer. measuring the infra-red light absorption at certain preselected wave lengths, calculating the composition of the gas sample from these measurements, and making such changes in the operating conditions of the process as indicated by the composition of the sample. These operations might take of the order of one or two hours and, although somewhat lengthy, they still represent an advantage over previous methods based on analyses by fractional distillation which might require as long as six hours for completion.

In two patents, Nos. 2,386.830 and 2,386,831 there is described apparatus by means of which a process may be controlled in response to the infrared absorption properties of the product. As shown in these patents, light is permitted to pass through a product sample and on to detector cells each having a principal light absorping band corresponding closely in wave length to that of a product component. The method and apparatus described in the above patents is not entirely satisfactory due to the fact that substances are not readily available which have a light absorbing band whose wave length corresponds to a distinctive band of a product component. Furthermore such light absorbing substances usually have broad absorption bands, this fact seriously reducing the sensitivity of this apparatus.

In a copending application Ser. No. 740,828 by Coggeshall and Muskat entitled Automatic system of process control by infra-red spectrometry filed of even date herewith and assigned to the same assignee as this application, there is described an apparatus for automatically operating an infra-red spectrometer so as to successively take light transmission values of a product sample at a series of definite wave lengths, transducing and mixing signals representing these transmission values in such a way as to obtain signals representing the concentrations of various components of the sample and applying these signals to govern an operating condition of the process which produces the sample. However, in the repeated readjustment of the monochromator of the apparatus described in the above application of Coggeshall and Muskat mechanical wear may cause loss of delicate adjustment and mechanical vibration may cause instrumental errors which are avoided in the present invention. Difficulties arising from the program motor and the many electrical contacts required by the above apparatus of Coggeshall and Muskat and from the transient effects introduced throughout the system at each change in wave length setting are also eliminated by the apparatus of the present invention.

The present invention is an improvement over the heretofore described apparatus in that versatility and high precision is maintained by the use of monochromators instead of depending on selective absorption properties of substances in the detector. Such monochromators are easily adjusted to any desired wave length band, and when adjusted transmit only a very narrow band of wave lengths. A separate monochromator is used for each wave length setting, so that there is no opportunity for mechanical defects to develop.

A further advantage accrues to the present invention because observations are made continuously at each wave length, and this continuous operation allows faster control to be obtained.

Further simplification without loss of precision is achieved in certain embodiments of the present invention by causing the process to be controlled without the determination of actual product component concentrations. Such determinations fall in the category of recorded information and are unnecessary for purposes of control as indicated in this specification.

It is accordingly an object of this invention to provide apparatus for automatic process control.

Another object of this invention is to provide apparatus for automatic process control which utilizes infra-red absorption measurements on the product produced.

Another object of this invention is to provide improved apparatus by means of which the product of a process may be automatically maintained within a narrow range of composition through supervision of its infra-red absorption properties.

A further object of this invention is to provide improved automatic control apparatus comprising a series of infra-red absorption cells and spectroscopic infra-red monochromators each transmitting a definite infra-red wave length and which may be employed in the automatic control of the infra-red absorption properties of a process product.

A still further object of this invention is to provide improved automatic process control apparatus comprising a series of infra-red absorption cells through which a sample of the process product is passed and a series of infra-red monochromators each transmitting a definite infra-red wave length and a series of detectors for measuring the transmitted energy in terms of electrical signals which are continuously and automatically manipulated to give signals desirable for control purposes.

The manner of accomplishing these and other objects is explained in this specification of which the accompanying drawings form a part, and in which Fig. 1 is a block diagram showing diagrammatically the component parts of a simple embodiment of the apparatus of this invention.

Fig. 2 is a block diagram showing diagrammatically the component parts of a more precise embodiment of the apparatus.

Fig. 3 is a block diagram showing diagrammatically the component parts of an embodiment of the invention which may be used for purposes of indicating product component concentrations as well as for controlling the process.

Fig. 4 is a block diagram showing diagrammatically the component parts of a more precise embodiment of the apparatus as used for indicating product component concentration, as well as for controlling the process.

Figure 5:
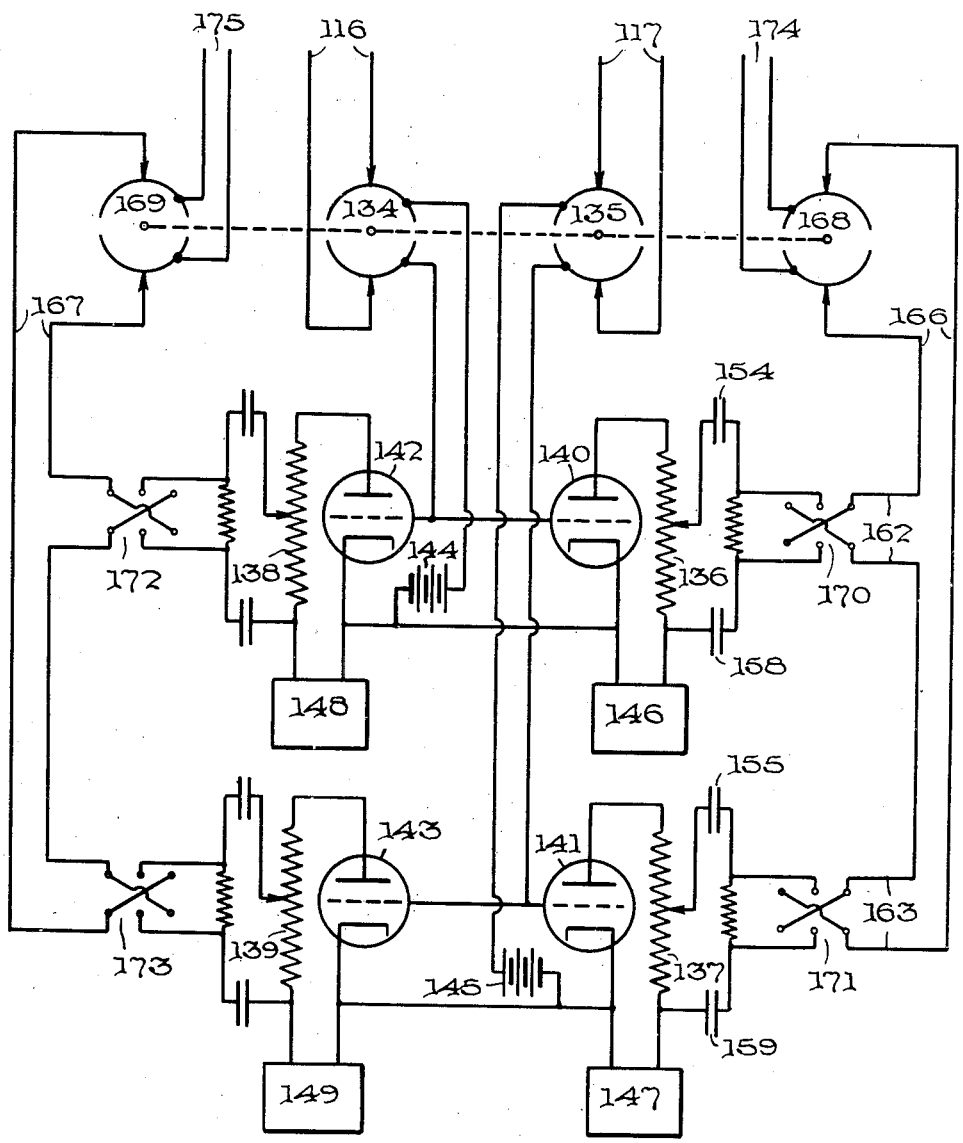
Fig. 5 is a wiring diagram of one type of computing circuit which may be used to transform transmission signals into component concentration signals.

Referring to Figure 1, an apparatus for carrying out a process is indicated schematically by numeral 1. Input to the processing apparatus may be through input lines 2 and at least part of the product output may be delivered through line 3. The processing apparatus may be controlled by control device 4 which may operate to control any condition affecting the reaction or process carried out in 1. The control device 4, which may for example be a valve, is supervised and actuated by means of the apparatus encompassed by this invention.

Part of the product output from line 3 is diverted through line 5 by pump 6 and passed into the infra-red absorption cell 7 and out through exhaust 8. The exhaust may alternatively be returned to line 3 or otherwise disposed of. Absorption cell 7 may be pressure and temperature controlled in order that the material therein may always be under uniform conditions. This cell is made with infra-red transparent windows, such as halite windows. It may have a length sufficient to give appreciable but not complete absorption of the incident infra-red energy. An infra-red source 9 supplies infra-red energy which is passed through the material in the absorption cell 7. Source 9 may be any customary device of this type such as a Globar heater, whose voltage supply is regulated so that the source intensity will remain stable. In order to isolate a particular wave length at which the absorption is to be determined, the infra-red energy after passing through the absorption cell 7 is passed through an infra-red monochromator 10. This is a well known device comprising a rock salt prism and system of mirrors, and arranged so that by proper adjustment one utilizes the refraction of the infra-red energy through the rock salt prism to transmit from an input slit to the output slit a particular narrow band of wave length. One such monochromator for example is shown in Figure 4 of U. S. Patent No. 2,388,105.

The infra-red energy from source 9 which is transmitted through absorption cell 7 and monochromator 10, is permitted to fall on a radiation detector 11. The detector 11 may conveniently comprise a thermocouple whole voltage is amplified by amplifier 12 connected thereto. Amplifier 12 may be any type of thermionic device or alternatively may comprise a galvanometer and a photoelectric amplifier. Output from the amplifier may be delivered to a relay 13 which in turn determines operation of the control device 4 to properly maintain the conditions such as to give optimum results in 1. Control device 4 may for example be a motor driven on-off valve. Control device 4 may alternatively be a throttling valve directly connected to the amplifier.

The apparatus may be adjusted so that a decrease in the amount of energy transmitted indicating excessive absorption in the product sample contained in cell 7 will cause actuation of the relay and control valve in one direction, while an increase in the amount of energy transmitted, indicating reduced absorption, will operate the relay and valve in the opposite direction. In order that control be obtained in regard to a significant constituent of the product output, the monochromator 10 may be adjusted to pass a predetermined wave length at which the significant component of the product output absorbs strongly. Thus the presence or absence of a predetermined amount of this constituent may be detected, and through the control valve conditions of the process changed so as to again obtain optimum operation. Through the use of the spectroscopic monochromator 10, the wave length band utilized may be adjusted to any fixed and narrow band significant of a pertinent component in the product.

In Figure 2 the control system of Figure 1 is improved in that operation may depend on the concentration of two or more components of the product. Processing means 1 having input lines 2 and output line 3 is sampled through line 5 by pump 6 and the sample passed successively into two absorption cells 17 and 18. Cells 17 and 18 may be temperature and pressure controlled and while shown connected in series they may alternatively be connected in parallel, the only requirement being that their samples be identical in composition. Infra-red source 9 supplies energy which passes through absorption cells 17 and 18. The source 9 is preferably stabilized by supplying it with regulated electric power. Subsequent to passing through the cells 17 and 18 respectively, the infra-red beams 15 and 16 are passed through monochromators 19 and 20, each of which is adjusted to pass a narrow fixed wave length band. One monochromator may be set to an absorption band which is prominent in one product component but which is absent or very weak in all other components. The other is set to a different absorption band which is prominent in another product component but which is absent or very weak in other components. Thus the absorption undergone by beams 15 and 16 are representative of the presence of two different product components.

The two beams are permitted to fall on thermocouples 21 and 22 which respond to the energy of beams 15 and 16 transmitted by the sample in the wave length bands determined by the settings of monochromators 19 and 20. Output from thermocouples 21 and 22 may be amplified by amplifiers 12 which deliver on leads 23 and 24 respectively, an electrical signal related to the concentration of each of the pertinent product components in the sample.

In order to operate a single control it is convenient to combine these electrical signals into a single signal through the agency of a computing means 25 which may, for instance, deliver on leads 26 an electrical signal proportional to some automatically determined function of the signals in leads 23 and 24. Thus for example the function computer 25 may determine a signal proportional to the ratio of the signals in leads 23 and 24. As examples of such ratio meters one may use a device known as a "Megger," or the electrical circuit shown in the U. S. Patent 2,129,880 granted to Scherbatskoy and Neufeld. As another example of function computing device one may employ an electro-dynamometer into which are fed the two electrical signals from leads 23 and 24 and which gives an indication proportional to their mathematical product.

The signal from function computing device 25 may be delivered to a relay 13 which in turn supervises the operation of control valve 4. In this manner one may govern the condition of the process and maintain it in the optimum operating condition with respect to the desired function of product components whose absorption bands have been set up on monochromators 19 and 20.

In Figure 3 the control apparatus of Figure 2 is modified so that the actual product component concentrations may be determined and recorded as well as used to control the process. Processing means 1 having input lines 2 and output line 3 is sampled through line 5 by pump 6 and the sample passed successively into absorption cells 17 and 18. Absorption cells 17 and 18 are pressure and temperature controlled. Fixed monochromators 19 and 20 are each adjusted to transmit a different wave length band. One monochromator is set to transmit a wave length at which one component has a strong absorption band, though other components may also absorb appreciably at this wave length. The other monochromator is set to another wave length at which another component has a strong absorption band, although the first component may also absorb appreciably at this wave length. Thus, for the operation of this embodiment it is not necessary that each wave length band used be unique for one component. A much wider field of choice of operating wave lengths is thus at the operator's disposal.

Energy beams 15 and 16 from the stabilized infra-red source 9 are partially absorbed in cells 17 and 18 respectively and the significant wave length picked out of their transmitted portion by monochromators 19 and 20 respectively and detected on thermocouples 21 and 22. The signal from the thermocouples may be amplified by amplifiers 12 which deliver a signal measurable on meters 43 proportional to the energy of a particular wave length transmitted by the sample.

The output from amplifier 12 is fed into a self balancing potentiometer system having galvanometer 44 and slide wire 45. A battery 46 supplies current through adjustable resistor 27 and ammeter 30 to the slide wire 45. The voltage output from amplifier 12 is balanced against a potential drop in slide wire 45. Galvanometer 44 has a contact-making pointer 28 which controls the direction of current through a reversible servo motor 29 connected to move the sliding contact of slide wire 45. Other known types of servo controls may be used to balance the potentiometer. By way of example the slide wire 25 is shown as covering an angle $\pi$ and the pointer will generally balance at some angle $\theta$ less than $\pi$. The slide wire 45 is made so that its resistance is uniformly distributed along its length; that is, so that its resistance increases linearly with the angle $\theta$ indicated in Figure 3.

In order to adjust the current in slide wire 45, the absorption cell may be isolated and evacuated by a vacuum pump not shown. The pointer of slide wire 45 is then set at full 100 per cent position ($\theta = \pi$) and resistor 27 adjusted so that a balance occurs at this point. This represents the condition when the energy received by the thermocouple is proportional to that without absorption, a quantity which may be designated as $I_{0\lambda 1}$. An ammeter 30 may be placed in the slide wire circuit so that this current may be maintained. Subsequently, in operation, when a product sample is in cell 18, the signal from amplifier 12 will be proportional to the energy transmitted after absorption has taken place at wave length $\lambda_1$. The balance point will then be at an angle $\theta$ (less than $\pi$) and proportional to a quantity which may be designated as $I_{\lambda 1}$. Thus in operation the ratio $\theta/\pi$ is a measure of the ratio $I_{\lambda 1}/I_{0\lambda 1}$.

In order to compute the product concentrations it is necessary to determine a signal proportional to the quantity log ($I_{0\lambda 1}/I_{\lambda 1}$) as will be explained later. This may be done by mechanically connecting the motor 29 to a second potentiometer 31 here shown as also covering an angle $\pi$ and having a special taper of resistance. Ordinarily gearing or direct connection may be used in making the mechanical connections to the motor as indicated, so that when a balance point is reached on slide wire 45, the value of $\theta/\pi$ on slide wire 45 will be duplicated on potentiometer 31. Potentiometer 31 is supplied with current from battery 32 through resistor 33 and ammeter 34. The signal to be obtained is tapped off from potentiometer 31 as an $ir$ drop by leads 36 and since $i$ may be adjusted it is merely necessary to wind the potentiometer 31 with a tapered resistance so as to give the proper value of $r = \log (I_0\lambda_1/I\lambda_1)$ at various values of $\theta$.

The signal desired is $\log (I_0\lambda_1/I\lambda_1)$ or $\log (\pi/\theta)$. Thus when $\theta$ equals $\pi$ radians the desired signal is $\log (\pi/\pi = 0)$. As $\theta$ becomes smaller than $\pi$ the $ir$ drop to be tapped off is to increase. By connecting leads 36 to the high end of the potentiometer 31 as shown in Figure 3, the signal desired may be obtained if the resistance of potentiometer 31 follows the form $\log (\pi/\theta)$. Assuming for example, a current $i$ of one ampere, to which the current may be adjusted by resistor 33 and indicated by ammeter 34, the following table indicates the resistance values which potentiometer 31 should have at various angles $\theta$, the resistance $r$ being measured from $\theta$ to the high end of the potentiometer. Therefore, when $\theta$ has the value stated in the table, the leads 36 tap off as shown in Figure 3 the resistance $r$ stated in the table, giving the desired signal $\log (\pi/\theta)$ or $\log (I_0\lambda_1/I\lambda_1)$.

| $\theta$ Degrees | $\theta$ Radians | $\pi/\theta$ | $r = \log (\pi/\theta)$ |
|---|---|---|---|
| | | | Ohms |
| 180 | $\pi$ | 1.00 | 0 |
| 135 | $3\pi/4$ | 1.33 | .285 |
| 90 | $\pi/2$ | 2 | .693 |
| 45 | $\pi/4$ | 4 | 1.383 |
| 22½ | $\pi/8$ | 8 | 2.079 |
| 18 | $\pi/10$ | 10 | 2.303 |
| 11¼ | $\pi/16$ | 16 | 2.773 |
| 4 | $\pi/45$ | 45 | 3.807 |
| 2 | $\pi/90$ | 90 | 4.500 |
| 1 | $\pi/180$ | 180 | 5.193 |

Other values of $i$ may be used with proportionally different values of $r$ necessary to give the proper $ir$ drop. Thus if a current of 0.1 ampere is used the resistance values given in the right hand column of the table may be increased by a factor of 10. The slide wire 31 may be made to have the resistance values required in the customary manner of making tapered rheostats.

It is apparent that if $\theta$ becomes 0, an indeterminately large value of $r$ would be required, but this difficulty may be circumvented by stopping the increase of resistance $r$ of potentiometer 31 at some small finite point such as $\theta = 1$ degree. Operation may always be in the range between this lower limit and $\pi$ by merely arranging the length of the absorbing column in the absorption cell 18 so that one does not approach total adsorption and thus avoiding operation near $\theta = 0$. It is thus possible to obtain on leads 36 an electrical voltage signal which is equal to $\log (I_0\lambda_1/I\lambda_1)$.

In precisely the same manner one may deliver to leads 37 a signal equal to $\log (I_0\lambda_2/I\lambda_2)$.

The quantities $\log (I_0\lambda_1/I\lambda)$ and $\log (I_0\lambda_2/I\lambda_2)$ are termed optical densities and may be recorded if desired by recording the voltage signals on leads 36 and 37 respectively by meters not shown.

It can be shown that the quantities thus represented by the electrical signals in leads 36 and 37 are the variables in a set of simultaneous linear algebraic equations which relate the product component concentrations. The solution of these equations gives the product component concentrations desired. Such a solution may be automatically obtained by means of a linear algebraic equation solver 38 to be described later.

When light of monochromatic radiation falls upon a substance some of the light is absorbed. The per cent of light absorbed depends upon the compound and upon the wave length of the light. If the light passes through a thickness $d$ of the material, and if the density is such as to provide a concentration C, then the relation between the light intensity $I_0$ incident on the layer of material and the intensity $I$ which is transmitted through it is:

$$\log (I_0/I) = \bar{a} C d$$

where $\bar{a}$ is a physical constant called the "extinction coefficient" and which is known to depend only upon the compound and upon the wave length. This relationship is known as Beer's law, and it is generally followed by most compounds and their mixtures.

For a given wave length $\lambda$ the absorbing powers of different pure materials are characterized by numerical differences in the individual extinction coefficients. The extinction coefficients for a particular compound depend upon wave length, and in the infra-red region there will be wave length values for which the extinction coefficient is known to be large compared to other regions. These correspond to the well known infra-red absorption bands.

The quantity $\log (I_0/I)$ is designated as the optical density, and may be denoted by D. An electric voltage signal equal to D is delivered by leads 36 and 37 of Figure 3. For a mixture of materials the resulting optical density is known to be an additive function of the contributions of the individual compounds. That is, the optical density for a mixture consisting of a concentration $C_1$ of compound 1 and a concentration $C_2$ of compound 2 will at a definite wave length be given by:

$$D = \bar{a}_1 C_1 d + \bar{a}_2 C_2 d$$

or, if the length $d$ of the absorption cell is always constant one may combine the extinction coefficients and the length into single constants to get:

$$D = a_1 C_1 + a_2 C_2 \quad (1)$$

Thus, for example, in making infra-red analyses of n-butane and isobutane mixtures it is sufficient to determine the optical densities at two wave lengths, designated by $\lambda_1$ and $\lambda_2$. The wave lengths which may advantageously be used for this case are: $10.2\mu$ and $8.45\mu$ ($\mu = 10^{-4}$ cm.). At $10.2\mu$ n-butane absorbs strongly and isobutane weakly; at $8.45\mu$ isobutane absorbs strongly. The optical densities, $D_1$ and $D_2$ at these two wave lengths will therefore be:

$$\left.\begin{array}{l} D_1 = a_{11} C_1 + a_{12} C_2 \\ D_2 = a_{21} C_1 + a_{22} C_2 \end{array}\right\} \quad (2)$$

where $a_{11}$ and $a_{21}$ refer to the extinction coefficients of n-butane for wave lengths $\lambda_1$ and $\lambda_2$ respectively, while $a_{12}$ and $a_{22}$ refer to the extinction coefficients of isobutane for wave lengths and $\lambda_1$ and $\lambda_2$ respectively, these being known quantities. The quantities $C_1$ and $C_2$ are the concentrations of n-butane and isobutane in the sample of gas being analyzed.

Equations 2 will hold for any concentrations $C_1$ and $C_2$. Also, since the extinction coefficients are numerical constants these equations may be solved to yield:

$$\left.\begin{array}{l} C_1 = A_1 D_1 + B_1 D_2 \\ C_2 = A_2 D_1 + B_2 D_2 \end{array}\right\} \quad (3)$$

where $A_1$, $A_2$, $B_1$ and $B_2$ are functions of the extinction coefficients and can be computed by simple algebra. The values of $D_1 = \log(I_{0\lambda 1}/I_{\lambda 1})$ and $D_2 = \log(I_{0\lambda 2}/I_{\lambda 2})$ are obtained as electrical signals on leads 36 and 37 which are fed into an equation solver of known form. Depending on the form of the equation solver, Equations 2 or 3 may be entered into the device. Thus the equation solver described by Bowman also Bowman and Steinback in copending applications S. N. 479,790 and 590,698 may make use of Equations 2 directly, since these machines have provision for so-called constant terms which in this case are the signals $D_1$ and $D_2$.

For the simple case described here by way of example, wherein only two electrical signals are obtained from the infra-red absorption spectrometer, one may solve the Equations 3. A means of automatically solving the two simultaneous equations by combining the electrical quantities so as to obtain the concentrations of two components is shown in Fig. 5. Here 116 and 117 represent the leads bringing in the D.-C. voltage signals representing $D_1$ and $D_2$ respectively. Split ring commutators 134 and 135 run synchronously at about 3000 R. P. M. and convert these voltage signals into two A.-C. voltage signals which are in phase with each other. These A.-C. voltage signals will also be proportoinal to the quantities $D_1$ and $D_2$. Denoting the voltage from wires 116 by $V_{g1}$ and that from wires 117 by $V_{g2}$, we may write $V_{g1} = hD_1$ and $V_{g2} = hD_2$ where $h$ is the proportionality constant. These voltages are each fed into two tubes whose outputs are made proportional to the $A_1$, $B_1$, $A_2$, $B_2$ and combined in accordance with Equations 3 to yield the solutions of these equations.

In Fig. 5 the filament circuits are conventional and not shown, while 146, 147, 148, 149 represent plate supply devices isolated from each other. The signal from commutator 134 is added to the steady grid bias from battery 144 and applied to the grid of tubes 140 and 142. The plate current of tube 140 will depend on the voltage of battery 144 and of the voltage supply 146, and there will be an A.-C. component which depends on the magnitude of $V_{g1}$. By means of condensers 154 and 158 the D.-C. component of plate voltage is blocked out. The A.-C. component may be adjusted to the appropriate value proportional to $A_1$ by means of the sliding contact on resistance 136. Thus leads 162 will carry an A.-C. voltage which may be adjusted to be equal to the quantity ($A_1D_1$). Similarly the A.-C. voltage on the grid of tube 141 coming from commutator 135 will be $V_{g2} = hD_2$ and the plate output of tube 141 may be adjusted equal to the quantity ($B_1D_2$). The D.-C. component of the output from tube 141 is blocked out by means of condensers 155 and 159. Thus the A.-C. voltages in leads 162 and 163 are seen to represent the two quantities on the righthand side of Equation 3 and furthermore they are in phase. The addition may be made by simply connecting them in series so that wires 166 carry an A.-C. voltage equal to $A_1D_1 + B_1D_2$ and therefore equal to $C_1$. Thus the electrical signal in wires 166 is indicative of the concentration $C_1$ of component 1 in the product stream.

Similarly in Figure 5, the signals coming from commutators 134 and 135 are impressed on tubes 142 and 143 respectively. Output from these tubes is made proportional to $A_2$ and $B_2$ by an adjustment of potentiometers 138 and 139 respectively. Wires 167 are in this way made to deliver an A.-C. signal equal to $A_2D_1 + B_2D_2$ and therefore indicative of the concentration $C_2$ of component 2 in the product stream. Reversing switches 170, 171, 172 and 173 are provided to take care of the algebraic sign of the quantities $A_1$, $B_1$, $A_2$, $B_2$.

If the voltages representing the concentrations are desired to be D.-C. instead of A.-C. they may be rectified by means of synchronous commutators 168 and 169. Thus wires 116 and 117 carry into the device of Fig. 5 respectively the voltages proportional to the log $(I_{0\lambda 1}/I_{\lambda 1})$ signal at wave length $\lambda_1$ and at wave length $\lambda_2$ (obtained from wires 36 and 37 of Figure 3), while wires 174 and 175 deliver voltages proportional to the concentration of two components present in the gas stream being analyzed. These currents are continuous signals which may be recorded and used for desirable control purposes.

In Figure 3 the equation solver is indicated by 38 and it delivers on its output leads 39 and 40 signals which are proportional to the desired product component concentrations. These signals may be separately recorded on recorder 41 and under certain conditions may themselves be used to control the process. However for purposes of control it is usually simpler and more convenient to obtain a single signal in the form of the ratio of these concentrations. The device indicated by 25 may then take the form of a ratio meter, such as a "Megger," or an electrical circuit such as is indicated in U. S. Patent 2,129,880, or a device similar to the slide wire 45 with galvanometer 44 and balancing motor 29 as in Figure 3 of the present application.

In certain processes the equilibrium condition may depend on the arithmetical product of component concentrations in which case the device 25 may be an electrodynamometer or wattmeter. The function computor 25 may actuate a relay 13 which in turn supervises the operation of control device 4 affecting the condition of the process. Alternatively the output from computor 25 may control a throttling valve 4 connected directly to it.

Figure 4 shows an embodiment of the invention in which improved accuracy is obtained through the use of blank absorption cells, the transmitted intensity through the sample absorption cells being compared directly with that through a blank absorption cell. The processing means 1, as in the previous figures, has input line 2 and output line 3. Control device 4 governs the process through control of some condition which affects the product output. The output is sampled by line 5 through pump 6, which passes the sample into absorption cells 17 and 18 through which infra-red energy from sources 9 and 9' is passed. Absorption cells 17 and 18 are temperature and pressure controlled. The energy from sources 9 and 9' is also passed through an auxiliary absorption cell 17' and 18' which may be identical to cells 17 and 18 except that they are evacuated and therefore produce no absorption due to anything in the product. The energy from sources 9 and 9' is conveniently split by means of mirrors 48. The energy transmitted through cell 17 is less in intensity than that transmitted through 17', and the ratio of these intensities will be independent of light source fluctuations such as result from electrical disturbances. The light is passed through monochromators 19 and 19' on to thermocouples 21 and 21'. Monochromators 19 and 19' are adjusted to pass the same wave length and indeed one may combine these into a single unit through whose optical system the two systems are passed, one being spaced above the other in a manner well known in the art. Similarly monochromators 20 and 20' transmit to thermocouples 22 and 22' energy of a different wave length than 19 and 19'. Monochromators 20 and 20' pass the same wave length. Amplifiers 12 serve to amplify the output from the thermocouples.

The amplified signal from thermocouple 21' is applied across a slide wire 50 which may, for example, be of length L and whose resistance varies linearly along its length. The amplified signal from thermocouple 21 is balanced against a portion of the potential across rheostat 50 by means of a self-balancing servo motor 29 controlled through galvanometer 44 operating contacts 28 which are closed in the appropriate direction to drive the sliding contact of the potentiometer 50 toward the balance point. The motor 29 is mechanically connected to the slider of slide wire 50 so as to bring it to a balance point at, for example, a position $x$. Thus the ratio of $x/L$ is a measure of the light intensity ratio $I\lambda_1/I_0\lambda_1$. This balance point representing the ratio of intensities will not change if there are variations of light intensity from source 9'. Furthermore the current in slide wire 50 need not be monitored and is, so to speak, automatically adjusted by the intensity through the blank cell 17'.

Mechanically connected to the slider of potentiometer 50 and motor 29 is a slider of auxiliary potentiometer 51. Potentiometer 51 may conveniently have the same length as potentiometer 50 but this condition is not necessary, it being merely sufficient to arrange the mechanical connection so that the position $x'$ of the pointer of 51 bears the same ratio to the length $L'$ of potentiometer 51 as $x$ does to L. Such a connection is easily arranged through the use of ordinary gears. Thus the ratio of $x'/L'$ equals $x/L$. By connecting that portion of the potentiometer 51 from the slider to the high end, as shown, the leads 37 may be made to deliver a signal proportional to log $(I_0\lambda_1/I\lambda_1)$. In order to accomplish this the resistance of that portion of the slide wire 51 which is tapped off by leads 37 will have a form similar to that shown in the preceding table, $L'/x'$ now replacing $\pi/\theta$ of the table. Such a resistance is easily wound on a card of the proper shape, in a well known manner. At the very low end where $x'$ approaches zero the logarithmic form may be discontinued and, as described with reference to Figure 3, one may avoid operating at this end of the potentiometer 51 by proper adjustment of length of the absorption cells 17 and 18 to avoid nearly complete absorption. The current in potentiometer 51 may be maintained by means of a battery 32, resistance 33 and ammeter 34. In a similar manner leads 36 deliver a signal proportional to log $(I_0\lambda_2/I\lambda_2)$. The signals from leads 36 and 37 may then be fed into equation solver 38 which delivers on its output leads 39 and 40 electrical signals proportional to the product component concentrations. The latter may be recorded on recorder 41 and also fed into function computer 25 which in turn may operate relay 13 supervising control device 4 as has been described in connection with Figure 3.

The control apparatus of this invention has been illustrated as applied to analysis for two components in the product stream but it may be extended to handle any desired number of components by merely increasing the number of channels. Such a channel for example is illustrated in Fig. 3 by devices 18, 20, 22, 12, potentiometer 45 and its associated equipment and potentiometer 31 and its associated equipment. For multi-component analysis an equation solver shown by Bowman and Steinback in copending application Serial No. 590,698 entitled Calculating machine may be used as device 38. This calculating machine will solve any number of the Equations 2 previously mentioned. The signals therefrom may be used in pairs by the ratio meter 25 to control various conditions of the process. Thus, for example one significant ratio may be used to supervise the temperature and the ratio of two other component concentrations used to supervise for example the rate of feed of a reactant, etc. The arithmetical product of some concentrations may be combined with the ratio of other concentrations if desired. This may be done by combining the output of the ratio meter and of an electrodynamometer, so that the operator may obtain control governed by a more involved function of the concentrations.

What I claim as my invention is:

1. Process control apparatus comprising a plurality of sources of infra-red radiation, a plurality of pairs of infra-red absorption cells adapted to receive radiation from their respective radiation sources, each pair of cells having one adapted to receive an identical sample of a product of the process while the other cell in each pair is evacuated, monochromators disposed in the path of radiation transmitted through said absorption cells, each pair of monochromators being adjusted to separate from transmitted radiation received from its one of a related pair of absorption cells a band of radiation of a wavelength corresponding to an absorption band of a product component, radiation detectors disposed for receiving radiation of said wavelength from their corresponding monochromators and for transforming the same into first electrical signals representative of the intensity of the radiation incident thereon, means for amplifying the first electrical signals, a linear slide wire potentiometer connected to each pair of amplifying means and adapted to automatically position its contact arm so as to balance the amplifier output signal from the radiation path through the sample cell against a portion of the signal from the radiation path through the evacuated cell, follow-up means including a second potentiometer coupled to each contact arm and movable therewith to bring the contact arm of the second potentiometer into a position corresponding to the balance position of the first contact arm, the second potentiometer including a battery and logarithmic slide wire traversed by a contact arm, whereby the resultant balance position of the second potentiometer produces an input signal proportional to the logarithm of the ratio of the intensities of the radiation incident upon the radiation detector through the evacuated cell to the radiation incident upon the other radiation detector from the unevacuated cell, an equation solver adapted to receive said input signals and to deliver in its output leads electrical signals proportional to the respective product component concentrations, and means responsive to the magnitude of said concentration signals for controlling a process operating parameter.

2. The construction according to claim 1, characterized further in that said last mentioned means comprises a ratio meter adapted to produce from said final electrical signals an output signal proportional to the ratio of any selected pair of product component concentrations, and a relay operative responsive to the magnitude of said output signal for actuating a control valve affecting a condition of the process.

3. An infra-red absorption spectrometer comprising a source of infra-red radiation, a pair of infra-red transmission cells interposed in the path of radiation from said source, one cell being adapted to receive a sample while the other cell is evacuated, monochromators disposed in the path of radiation transmitted through said cells, said monochromators being adjusted to separate from transmitted radiation received from said cells a narrow band of radiation of a desired wavelength, radiation detectors disposed for receiving radiation of said wavelength from the monochromators and for transforming the same into electrical signals representative of the intensity of the radiation incident thereon, means for amplifying said electrical signals, a linear slide wire potentiometer connected to said amplifying means and adapted to automatically position its contact arm so as to balance the amplifier output signal from the radiation path through the sample cell against a portion of the signal from the radiation path through the evacuated cell, follow-up means including a second potentiometer coupled to said contact arm and movable therewith to bring the contact arm of the second potentiometer into a position corresponding to the balance position of the first contact arm, the second potentiometer including a battery and logarithmic slide wire traversed by a contact arm, whereby the resulting balance position of the second potentiometer produces an output signal proportional to the logarithm of the ratio of the intensities of the radiation incident upon the radiation detector through the evacuated cell to the radiation incident upon the other radiation detector through the unevacuated cell, and means for indicating said last named ratio.

OTTO F. RITZMANN.

REFERENCES CITED

The following references are of record in the file of this patent:

UNITED STATES PATENTS

| Number | Name | Date |
|---|---|---|
| 2,314,800 | Pineo | Mar. 23, 1943 |
| 2,376,311 | Hood | May 15, 1945 |
| 2,386,831 | Wright | Oct. 16, 1945 |
| 2,404,064 | Heigl et al. | July 16, 1946 |
| 2,431,019 | Barnes | Nov. 18, 1947 |